US006768101B1

(12) United States Patent
Lee et al.

(10) Patent No.: US 6,768,101 B1
(45) Date of Patent: Jul. 27, 2004

(54) HIGH RESOLUTION OPTICAL ENCODER WITH AN ANGULAR COLLIMATED LIGHT BEAM

(75) Inventors: Boon Kheng Lee, Damai Simpang Empat (MY); Kee Siang Goh, Penang (MY); Yee Long Chin, Perak (MY); Chee Keong Chong, Penang (MY); Gurbir Singh, Penang (MY)

(73) Assignee: Agilent Technologies, Inc., Palo Alto, CA (US)

( * ) Notice: Subject to any disclaimer, the term of this patent is extended or adjusted under 35 U.S.C. 154(b) by 40 days.

(21) Appl. No.: 10/455,641

(22) Filed: Jun. 4, 2003

(51) Int. Cl.[7] ................................................. G01D 5/14
(52) U.S. Cl. ................... 250/231.13; 250/216; 359/641
(58) Field of Search .......................... 250/231.13, 216, 250/208.1; 359/641

(56) References Cited

U.S. PATENT DOCUMENTS 6,525,303 B1 * 2/2003 Gladnick .................. 250/208.1

* cited by examiner

*Primary Examiner*—Hung X. Dang
(74) *Attorney, Agent, or Firm*—Timothy H. Joyce

(57) ABSTRACT

A high resolution optical encoder with an angular collimated light beam. The optical encoder includes a source, a collimator, a reflective surface and a receiver. The light beam is collimated using a collimator and/or source at an angle to the plane of the reflective surface.

13 Claims, 4 Drawing Sheets

Non-collimated light beam

Partially collimated angular light beam with tilted lens and straight extended source Partially collimated angular light beam with tilted lens and tilted extended source Perfect collimated angular light beam (ideal case)

HIGH RESOLUTION OPTICAL ENCODER WITH AN ANGULAR COLLIMATED LIGHT BEAM

FIELD OF THE INVENTION

The invention relates to the field of optical encoders, and more particularly to an angular collimated reflective optical encoder.

BACKGROUND OF THE INVENTION

There are a number of types of optical encoders available on the market today. Optical encoders are particularly useful for scanning information or movements and recording or transmitting such information. For instance, optical encoders have been used extensively on automation lines or in conjunction with robots to determine movement or actions in the assembly process. Each of the optical encoders on the market generally includes a source, a reflective code wheel and a receiver. A problem with these designs concerns the fact that the light beam in certain instances is out of phase or dispersed as it passes from source to reflective code wheel to receiver. This leads to lower overall signal and signal contrast that is detectable by receiver and may provide poor results or operation depending upon how the optical encoder has been used. Certain applications require improved resolution in order to take advantage of the optical encoder devices. Furthermore, it is desirable to have a design in which all components are present on the same platform so that a common surface mount may be employed. These and other problems of the art have been obviated by the present invention.

SUMMARY OF THE INVENTION

The invention provides an angular collimated reflective optical encoder. The angular collimated reflective optical encoder comprises a source for providing a light beam, a collimator adjacent to the source for collimating the light beam at a defined angle, a reflective surface adjacent to the collimator for reflecting the light beam collimated by the collimator, and a receiver for receiving the reflected and collimated light beam.

BRIEF DESCRIPTION OF THE DRAWINGS

Embodiments of the invention will now be described with reference to the drawings, in which.

DETAILED DESCRIPTION OF THE INVENTION

Before describing the invention in detail, it must be noted that, as used in this specification and the appended claims, the singular forms "a," "an," and "the" include plural referents unless the context clearly dictates otherwise. Thus, for example, reference to "a source" includes more than one "source". Reference to a "reflective code wheel" or "receiver" includes more than one "reflective code wheel" or "receiver". In describing and claiming the present invention, the following terminology will be used in accordance with the definitions set out below.

The term "adjacent" or "adjacent to" refers to a component or element that is near, next to or adjoining. For instance, a flange may be adjacent to a cover glass.

The term "substantially" or "substantially perpendicular" refers to an alignment that is near to being perpendicular or closely perpendicular, but not exactly perpendicular. In a position that may look perpendicular or approach being perpendicular or orthogonal.

All patents and other cited references are incorporated into this application by reference.

Figure 1:
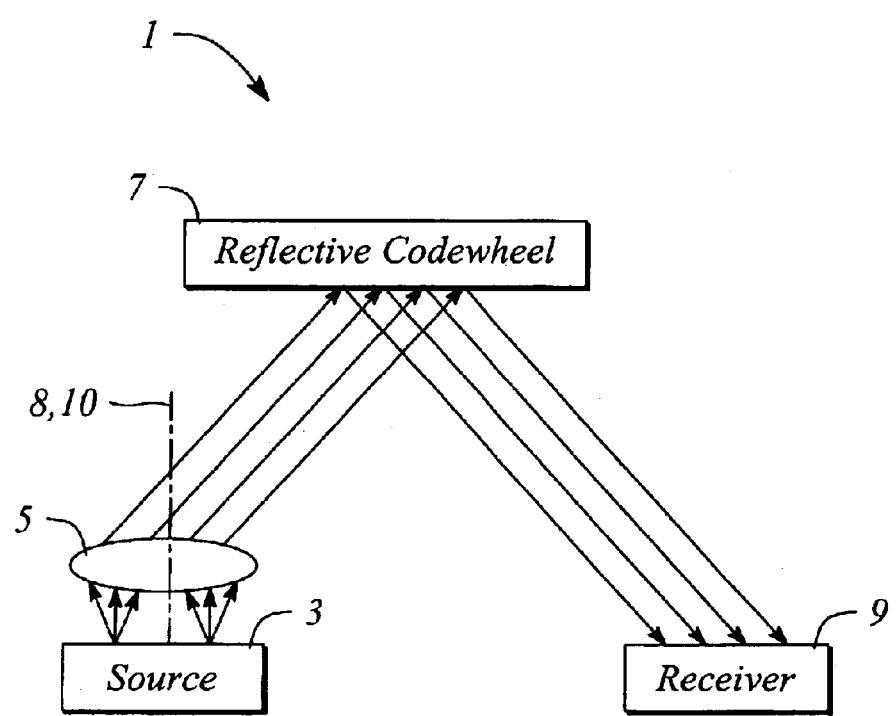
FIG. 1 shows a perspective view of a first embodiment of the present invention.

Referring first to FIG. 1, the angular collimated reflective optical encoder 1 of the present invention can be seen. The angular collimated reflective optical encoder 1 comprises a source 3 for providing a light beam, a collimator 5, a reflective surface 7, and a receiver 9. The collimator 5 is adjacent to the source 3 and is used for collimating the light beam produced from the source 3. The collimator 5 collimates the light beam in a first direction at a defined angle to the plane of the reflective surface 7, The source 3 is designed for providing a detectable light beam. The source 3 may comprise any number of light producing materials or devices that are well known in the art. For instance, the source 3 may be selected from the group consisting of a diode, a light emitting diode (LED), a photo cathode and a light bulb. The source 3 may be a light source that produces a light selected from the group consisting of infrared light, ultraviolet light, and visible light. The source 3 may comprise a central axis 8. The source 3 may be positioned in such a way that the central axis 8 of the source 3 may be perpendicular to the plane of the reflective surface 7.

The collimator 5 is adjacent to the source 3 and may comprise any of a number of devices well known in the art. For instance, the collimator may comprise a single or double surface. A double surface is effective in collimating a light beam at an angle in a defined direction. The collimator 5 may comprise a central axis 10 that is substantially perpendicular to the plane of the reflective surface 7.

The reflective surface 7 is positioned adjacent to the collimator 5 and is used for reflecting the collimated light beam emitted from the collimator 5 in a second direction. The reflective surface 7 may comprise a portion of a reflective code wheel or other similar device that is well known in the art.

The receiver 9 may comprise any of a number of devices well know in the art. For instance, the receiver may be selected from the group consisting of a photodiode, a photo cathode, and a photo multiplier.

FIG. 1 shows a first embodiment of the present invention. In this embodiment of the invention, the source 3 and the collimator 5 are positioned along a similar axis. In other words, the central axis 8 of the source 3, and the central axis 10 of the collimator 5 are perpendicular or substantially perpendicular to the reflective surface 7. The collimator 5 produces a collimated light beam at a defined angle defined between the central axis 8 and the plane of the reflective surface 7. The defined angle is from about 30 to about 60 degrees. The angular beam provides the advantage of collecting the light beam produced from the source 3 and collimated by the collimator 5.

Figure 2:
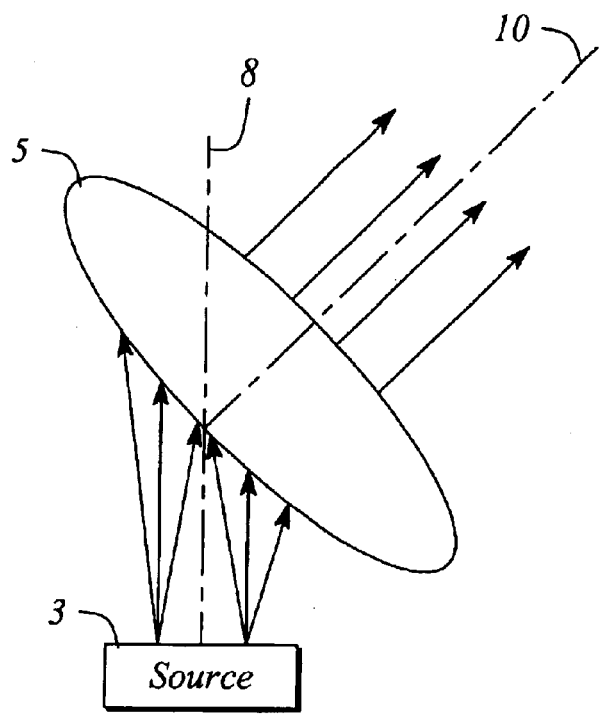
FIG. 2 shows a side elevation view of a second embodiment of the invention.

FIG. 2 shows a second embodiment of the present invention. In this embodiment, the source 3 and the central axis 8 of the source 3 are positioned perpendicular or substantially perpendicular to the plane of the reflective surface 7. However, the collimator 5 is positioned at an angle. In other words, the central axis 10 of the collimator 5 is positioned to define an angle from about 30 degrees to about 60 degrees between the central axis 10 and the plane of the reflective surface 7. The angle allows for focusing the beam of light received from the source 3. The collimated light beam produces a magnification of the signal received by the receiver 9 resulting in improved resolution.

Figure 3:
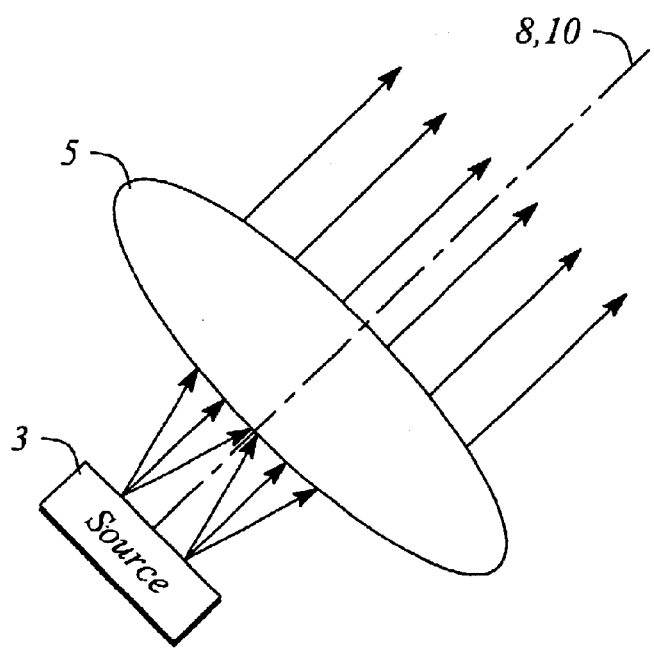
FIG. 3 shows a side elevation view of a third embodiment of the invention.

FIG. 3 shows a third embodiment of the present invention. In this embodiment, both the central axis 8 of the source 3 and the central axis 10 of the collimator 5 are positioned at an angle to the plane of the reflective surface 7. For instance, the central axis 8 of the source 3 is positioned from about 30 to about 60 degrees from the plane of the reflective surface 7. The collimated light beam that is produced travels along the central axis 8 toward the reflective surface 7.

The invention should not be interpreted to be limited to the above-described embodiments. Other embodiments may also be employed that are not expressly discussed here. The important function being the ability to collimate and intensify light at an angle relative to the plane of the reflective surface 7. This produces an overall improved signal that may be more easily detected by a receiver 9.

Figure 4A:
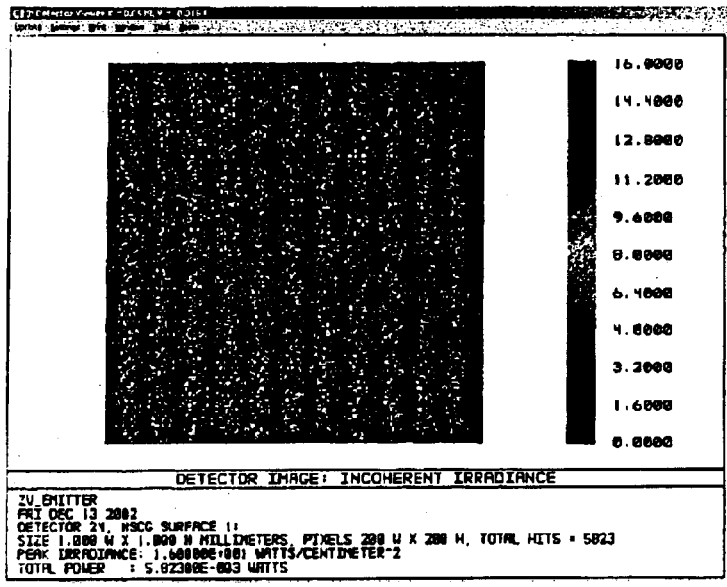
FIG. 4A shows the results of a simulation for a reflective code wheel of 360 LPI (Lines Per Inch) with a non-collimated light beam.
Figure 4B:
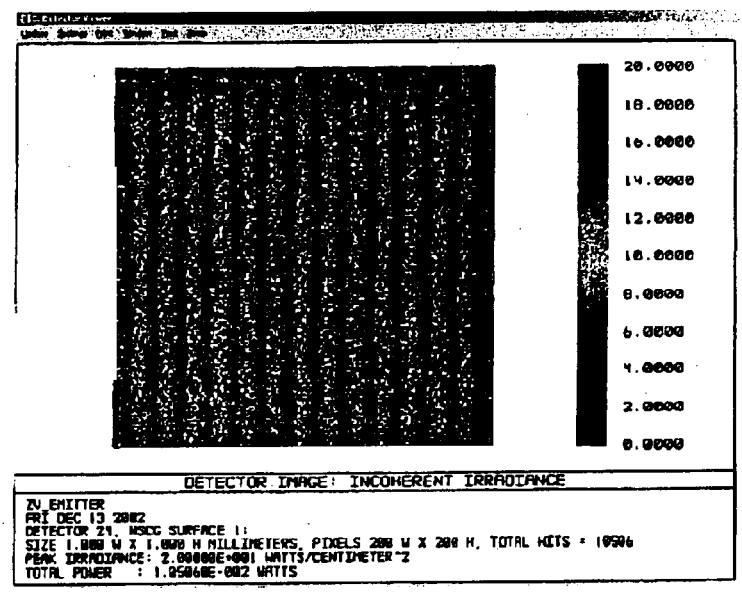
FIG. 4B shows the results of a simulation for a reflective code wheel of 360 LPI with collimated angular light beam with tilted lens and straight extended light source.
Figure 4C:
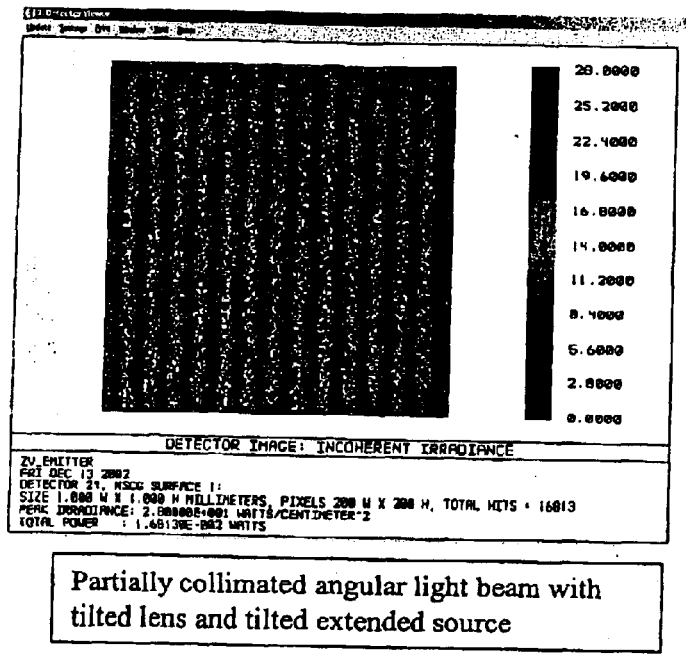
FIG. 4C shows the results of a simulation for a reflective code wheel of 360 LPI with tilted lens and tilted source.

FIGS. 4A–4C show some Zemax simulations of the present invention. The results of the each of the simulations are shown in the FIGS. 4A–4D. Each simulation was performed for a reflective code wheel of 360 lines per inch (LPI) with evolution of non-collimated to collimated angular light beam.

FIG. 4A shows the results of a collimated light beam. The detector image shows various intensity points (pixels) across the screen with poor contrast.

FIG. 4B shows the results of a partially collimated angular light beam with tilted lens and straight extended source (Shown as the second embodiment in FIG. 2). The results show an increased contrast of the collimated light beam on the detector surface relative to the non-collimated beam. The increased contrast shows the importance of the angular collimated light beam for achieving high resolution in the reflective optical encoder.

FIG. 4C shows the results of a collimated angular light beam with tilted lens and tilted extended source (Shown as the third embodiment in FIG. 3). The results show an increased intensity of the collimated light beam on the detector surface relative to the non-collimated beam. The increased contrast shows the importance of the angular collimated light beam for achieving high resolution in the reflective optical encoder.

Figure 4D:
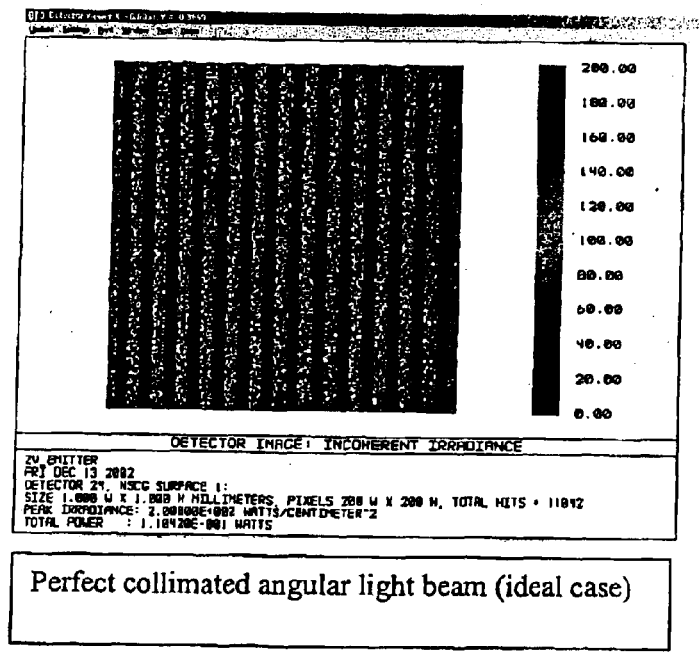
FIG. 4D shows the results of a perfectly collimated angular light beam.

FIG. 4D shows the results of a perfectly collimated angular light beam. The bands and striations are most distinct and defined.

Clearly, minor changes may be made in the form and construction of the invention without departing from the scope of the invention defined by the appended claims. It is not, however, desired to confine the invention to the exact form herein shown and described, but it is desired to include all such as properly come within the scope claimed.

We claim:

1. An angular collimated reflective optical encoder, comprising:
    (a) a source for providing a light beam;
    (b) a collimator adjacent to the source for collimating the light beam at a defined angle;
    (c) a reflective surface adjacent to the collimator for reflecting the light beam collimated by the collimator; and
    (d) a receiver for receiving the reflected and collimated light beam.

2. An angular collimated reflective optical encoder as recited in claim 1, wherein the collimator is a double surface.

3. An angular collimated reflective optical encoder as recited in claim 1, wherein the collimator is a single surface.

4. An angular collimated reflective optical encoder as recited in claim 1, wherein the reflective surface comprises a portion of a reflective code wheel.

5. An angular collimated reflective optical encoder as recited in claim 1, wherein the light produces a light selected from the group consisting of infrared, ultraviolet, visible and electromagnetic.

6. An angular collimated reflective optical encoder as recited in claim 1, wherein the light source comprises a central axis that is substantially perpendicular to the plane of the reflective surface.

7. An angular collimated reflective optical encoder as recited in claim 1, wherein the collimator comprises a central axis that is substantially perpendicular to the plane of the reflective surface.

8. An angular collimated reflective optical encoder as recited in claim 6, wherein the light source comprises a central axis that is substantially perpendicular to the plane of the reflective surface and the emitted light beam defines an angle from about 30 to about 60 degrees between the central axis of the light source and the plane of the reflective surface.

9. An angular collimated reflective optical encoder as recited in claim 6, wherein the collimator comprises a central axis that is substantially perpendicular to the plane of the reflective surface and the collimated light beam defines an angle from about 30 to about 60 degrees between the central axis of the light source and the plane of the reflective surface.

10. An angular collimated reflective optical encoder as recited in claim 1, wherein the source is selected from the group consisting of a diode, a light emitting diode (LED), a photodiode, and a light bulb.

11. An angular collimated reflective optical encoder as recited in claim 1, wherein the receiver is selected from the group consisting of a receiver, a photo cathode and a photo multiplier.

12. An angular collimated reflective optical encoder as recited in claim 1, wherein the source comprises a central axis that is perpendicular to the plane of the reflective surface and the collimator comprises a central axis that is positioned from about 30 to about 60 degrees from the central axis of the light source.

13. An angular collimated reflective optical encoder as recited in claim 1, wherein the source comprises a central axis that is from about 30 to about 60 degrees to the plane of the reflective surface and the collimator comprises a central axis that is positioned from about 30 to about 60 degrees from the plane of the reflective surface.

* * * * *

(12) EX PARTE REEXAMINATION CERTIFICATE (9833rd)
United States Patent
Lee et al.

(10) Number: US 6,768,101 C1
(45) Certificate Issued: Sep. 10, 2013

(54) HIGH RESOLUTION OPTICAL ENCODER WITH AN ANGULAR COLLIMATED LIGHT BEAM

(75) Inventors: Boon Kheng Lee, Damai Simpang Empat (MY); Kee Siang Goh, Penang (MY); Yee Long Chin, Perak (MY); Chee Keong Chong, Penang (MY); Gurbir Singh, Penang (MY)

(73) Assignee: Avago Technologies ECBU IP (Singapore) Pte. Ltd., Singapore (SG)

Reexamination Request:
No. 90/012,600, Sep. 14, 2012

Reexamination Certificate for:
Patent No.: 6,768,101
Issued: Jul. 27, 2004
Appl. No.: 10/455,641
Filed: Jun. 4, 2003

(51) Int. Cl.
*G01D 5/14* (2006.01)
*G01D 5/12* (2006.01)

(52) U.S. Cl.
USPC .............. 250/231.13; 250/216; 359/641

(58) Field of Classification Search
None
See application file for complete search history.

(56) References Cited

To view the complete listing of prior art documents cited during the proceeding for Reexamination Control Number 90/012,600, please refer to the USPTO's public Patent Application Information Retrieval (PAIR) system under the Display References tab.

*Primary Examiner* — Deandra M Hughes

(57) ABSTRACT

A high resolution optical encoder with an angular collimated light beam. The optical encoder includes a source, a collimator, a reflective surface and a receiver. The light beam is collimated using a collimator and/or source at an angle to the plane of the reflective surface.

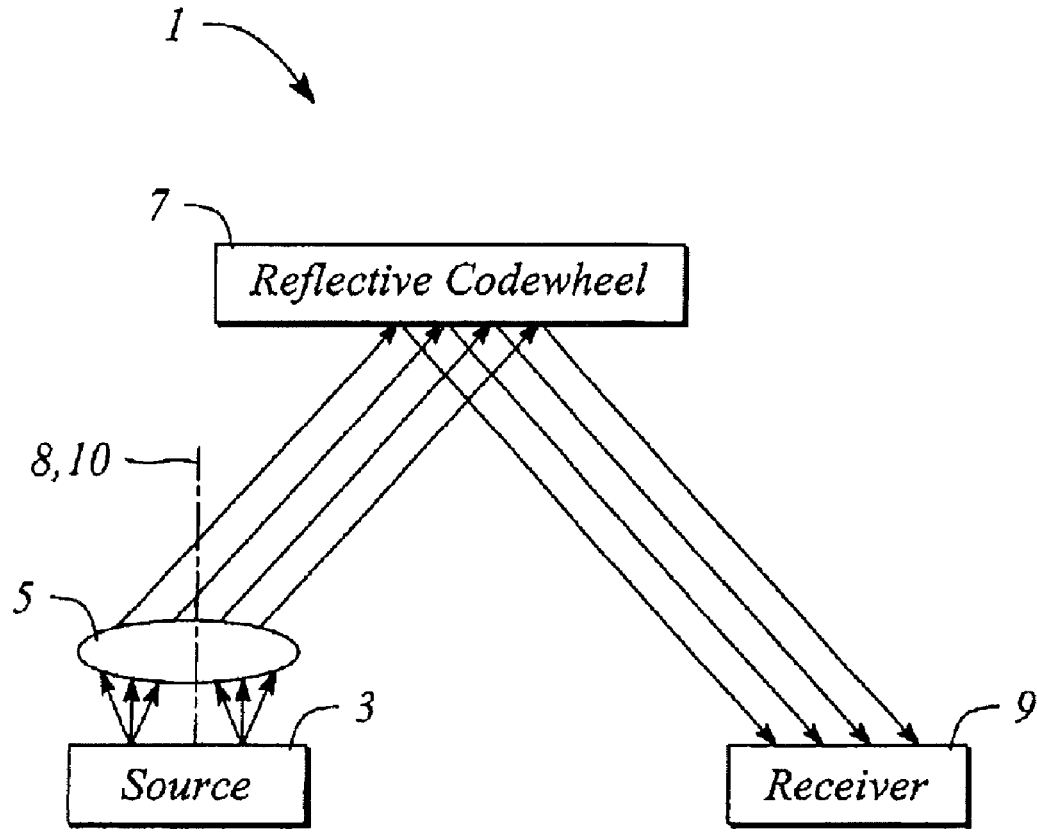

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 is cancelled.

Claims 1, 5 and 8-13 are determined to be patentable as amended.

Claims 2-3 and 6-7, dependent on an amended claim, are determined to be patentable.

New claims 14-16 are added and determined to be patentable.

1. An angular collimated reflective optical encoder *for scanning a reflective code wheel for at least one of information or movement*, comprising:
   (a) a *light* source, *disposed on a first side of the reflective code wheel,* for providing a light beam;
   (b) a collimator, *disposed between and* adjacent to the source *and the reflective code wheel*, for collimating the light beam at a defined angle *with respect to the reflective code wheel;*
   (c) a reflective surface *of the reflective code wheel* adjacent to the collimator for reflecting the light beam collimated by the collimator; and
   (d) a receiver, *disposed on the first side of the reflective code wheel,* for receiving the reflected and collimated light beam.

5. An angular collimated reflective optical encoder as recited in claim 1, wherein the light [produces a] *beam comprises infrared* light [selected from the group consisting of infrared, ultraviolet, visible and electromagnetic].

8. An angular collimated reflective optical encoder as recited in claim [6] *1*, wherein the [light source comprises a central axis that is substantially perpendicular to the plane of the reflective surface and the emitted light beam defines an] *defined* angle *is* from about 30 to about 60 degrees [between the central axis of the light source and the] *with respect to a* plane of the reflective surface.

9. An angular collimated reflective optical encoder as recited in claim 6, wherein the [collimator comprises a central axis that is substantially perpendicular to the plane of the reflective surface and the collimated] light beam defines an angle from about 30 to about 60 degrees [between the] *with respect to a* central axis of the light source [and the plane of the reflective surface].

10. An angular collimated reflective optical encoder as recited in claim 1, wherein the *light* source is selected from [the] *a* group consisting of a diode, a light emitting diode (LED), a photodiode, and a light bulb.

11. An angular collimated reflective optical encoder as recited in claim 1, wherein the receiver is selected from [the] *a* group consisting of a [receiver] *photodiode*, a photo cathode, and a photo multiplier.

12. An angular collimated reflective optical encoder as recited in claim 1, wherein the *light* source comprises a central axis that is perpendicular to [the] *a* plane of the reflective surface and the collimator comprises a central axis that is positioned *at an angle of* from about 30 to about 60 degrees [from] *with respect to* the central axis of the light source.

13. An angular collimated reflective optical encoder as recited in claim 1, wherein the *light* source comprises a central axis that is *at angle of* from about 30 to about 60 degrees to [the] *a* plane of the reflective surface and the collimator comprises a central axis that is positioned from about 30 to about 60 degrees from the plane of the reflective surface.

*14. An angular collimated reflective optical encoder as recited in claim 1, wherein the light beam comprises visible light.*

*15. An angular collimated reflective optical encoder as recited in claim 1, wherein the light beam comprises ultraviolet light.*

*16. An angular collimated reflective optical encoder as recited in claim 1, wherein the collimator comprises a lens.*

* * * * *